United States Patent
Geelhart et al.

(10) Patent No.: US 8,186,646 B2
(45) Date of Patent: May 29, 2012

(54) VALVE TRIM RETENTION APPARATUS

(75) Inventors: Theodore Paul Geelhart, Marshalltown, IA (US); Kimball Ralph Barron, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 1027 days.

(21) Appl. No.: 12/134,447

(22) Filed: Jun. 6, 2008

(65) Prior Publication Data
US 2009/0302247 A1    Dec. 10, 2009

(51) Int. Cl.
*F16K 47/00* (2006.01)
(52) U.S. Cl. ........ 251/122; 251/118; 251/356; 251/357; 251/360
(58) Field of Classification Search .................. 251/118, 251/120–122, 356, 357, 360
See application file for complete search history.

(56) References Cited

U.S. PATENT DOCUMENTS

| | | | |
|---|---|---|---|
| 1,364,848 A | | 1/1921 | Walsh |
| 4,047,695 A | * | 9/1977 | Cleveland et al. ............ 251/122 |
| 4,118,008 A | | 10/1978 | Myers |
| 4,469,123 A | * | 9/1984 | Merrill ......................... 251/361 |
| 4,705,062 A | * | 11/1987 | Baker .......................... 251/122 |
| 4,721,284 A | * | 1/1988 | Bankard ....................... 251/357 |
| 6,698,449 B2 | * | 3/2004 | Hall et al. ..................... 251/122 |
| 2008/0060704 A1 | | 3/2008 | McCarty |

FOREIGN PATENT DOCUMENTS

| | | |
|---|---|---|
| DE | 2152289 | 4/1972 |
| EP | 0116530 | 8/1984 |

OTHER PUBLICATIONS

Fisher Controls International, LLC., "Design 461 Increased Outlet Angle Sweep-Flo Valve", Fisher Valves Product Brochure, issued Mar. 2006, 8 pages.
International Searching Authority, "International Search Report," issued in connection with counterpart international application No. PCT/US2009/042845, mailed Aug. 13, 2009, 5 pages.
International Searching Authority, "Written Opinion of the International Searching Authority," issued in connection with counterpart international application No. PCT/US2009/042845, mailed Aug. 13, 2009, 5 pages.

* cited by examiner

*Primary Examiner* — Steven J Ganey
(74) *Attorney, Agent, or Firm* — Hanley, Flight & Zimmerman, LLC

(57) ABSTRACT

Valve trim retention apparatus for use with valves are described. An example valve trim retention apparatus includes a liner to retain a valve seat within a valve body. The liner includes an outer surface having first external threads to engage a first threaded opening of the valve body. A ring retainer engages the liner and has second external threads to engage a second threaded opening of the valve body. The first and second threaded openings cause the liner and the ring retainer to move in opposite directions when the liner and the ring retainer are rotated in same direction.

18 Claims, 3 Drawing Sheets

VALVE TRIM RETENTION APPARATUS

FIELD OF THE DISCLOSURE

This disclosure relates generally to control valves and, more particularly, to valve trim retention apparatus.

BACKGROUND

Valves are often used in process control plants or systems to control the flow of process fluids. One common type of valve used in severe service applications (e.g., high pressure applications, high temperature applications, etc.), is a flow down angle-style control valve. Angle-style control valves are typically used in the chemical and petroleum industries, which often require control of residual oils or other liquids with coking properties.

Angle-style control valves include a body having an inlet turned at an angle from an outlet. A flow control member (e.g., a plug) is disposed within a passageway between the inlet and outlet and is operatively coupled to a valve stem. An actuator (e.g., a pneumatic actuator, an electric actuator, a hydraulic actuator, etc.) is operatively coupled to the valve stem (e.g., a sliding stem) to drive the flow control member between an open position and a closed position to control the flow of fluid through the valve. In the closed position, the flow control member engages a circumferential seal or seat ring disposed between the inlet and the outlet of the valve. A seat ring retainer or liner retains the seat ring within the valve body and has an elongated body that protects a surface of the outlet port of the valve body from, for example, corrosion, etc.

Due to the angle of the valve body, angle-style valves advantageously allow for easy draining, because the valve body or flow path of such valves does not have any pockets or areas that allow accumulation of fluid and/or residue. Furthermore, due to the angle of the valve body, angle-style valves advantageously channel fluid forces toward the center of the fluid flow, thereby channeling fluid forces such as, for example, imploding bubbles formed due to cavitation away from the valve body and/or the valve trim (e.g., seat ring, cage, valve plug, etc.). Channeling the fluid forces toward the center of the valve body prevents or substantially reduces damage to the valve trim and/or the valve body.

In high differential pressure applications, for example, fluid (e.g., a liquid, gas, steam, etc.) at an inlet of a valve typically has a relatively high pressure that is reduced to a substantially lower pressure at an outlet of the valve. The relatively high pressure differential can cause cavitation, flashing, vibration, and/or other unwanted fluid forces or effects between the inlet and the outlet of the valve. Due to the angle between the inlet and the outlet of the angle-style valve, the fluid forces caused by the pressure differential are channeled toward the center of the outlet and/or downstream piping. However, the pressure differential between the inlet and the outlet increases the velocity of the fluid flowing through the valve body. The increased velocity can cause the fluid flowing through the valve to experience turbulent flow, which can impart vibration to the valve body and/or downstream piping. Vibration can cause the seat retainer ring or liner to become loose and/or dislodge from the valve body, thereby resulting in lost production for the time required to disassemble the valve and re-couple the liner to the valve body.

SUMMARY

In one example, a valve trim retention apparatus includes a liner to retain a valve seat within a valve body. The liner includes an outer surface having first external threads to engage a first threaded opening of the valve body. A ring retainer engages the liner and has second external threads to engage a second threaded opening of the valve body. The first and second threaded openings cause the liner and the ring retainer to move in opposite directions when the liner and the ring retainer are rotated in same direction.

In another example, a fluid valve includes a valve body having an inlet and an outlet and a seat ring disposed within a passageway of the valve body between the inlet and the outlet. A seat ring retainer engages the seat ring to retain the seat ring within the valve body. The seat ring retainer includes an outer surface having first external threads to engage a first internally threaded opening in the valve body and the seat ring retainer threadably engages the first opening in a first direction. A ring member engages the seat ring retainer and has second external threads to engage a second internally threaded opening in the valve body. The ring member threadably engages the second opening in a second direction opposite to the first direction.

In yet another example, a valve trim retention apparatus comprises means to retain a valve seat within a valve body and means to prevent the means to retain from loosening in the valve body. Rotation of the means to retain and the means to prevent in the same direction causes the means to retain and the means to prevent to move in opposite directions to prevent the means to retain from loosening in the valve body.

DETAILED DESCRIPTION

In general, the example valve trim retention apparatus described herein prevents a seat ring retainer or liner from loosening and/or dislodging from (i.e., backing out of) a valve body due to, for example, vibration induced by fluid flowing through the valve. In particular, the example valve trim retention apparatus includes a liner having an externally threaded outer surface that engages a first internally threaded opening in the valve body and a ring member having an externally threaded outer surface that engages a second internally threaded opening in the valve body. The threads of the liner and the first opening are different from the threads of the ring member and second opening. For example, the threads of the liner and first opening are right-handed threads to enable the liner to threadably engage the valve body in a first direction (e.g., clockwise) and the threads of the ring member and the second opening are left-handed threads to enable the ring retainer to threadably engage the valve body in a second direction (e.g., counterclockwise) opposite the first direction.

Additionally, the liner and the ring member may be coupled together via a pin member. In this manner, the ring member couples to the liner so that rotation of the liner about an axis of rotation in a first direction also causes the ring member to rotate in the same direction about the axis of rotation. Thus, for example, if vibration induced by the process fluid causes the liner to rotate in a first direction that causes the liner to loosen from the valve body, rotation of the ring member in the same direction causes the ring member to tighten, thereby preventing the liner from loosening and/or dislodging from the valve body. Likewise, if rotation of the ring member in a second direction opposite the first direction causes the ring member to loosen from the valve body, rotation of the liner in the same direction causes the liner to become more tightly coupled to the valve body.

Figure 1:
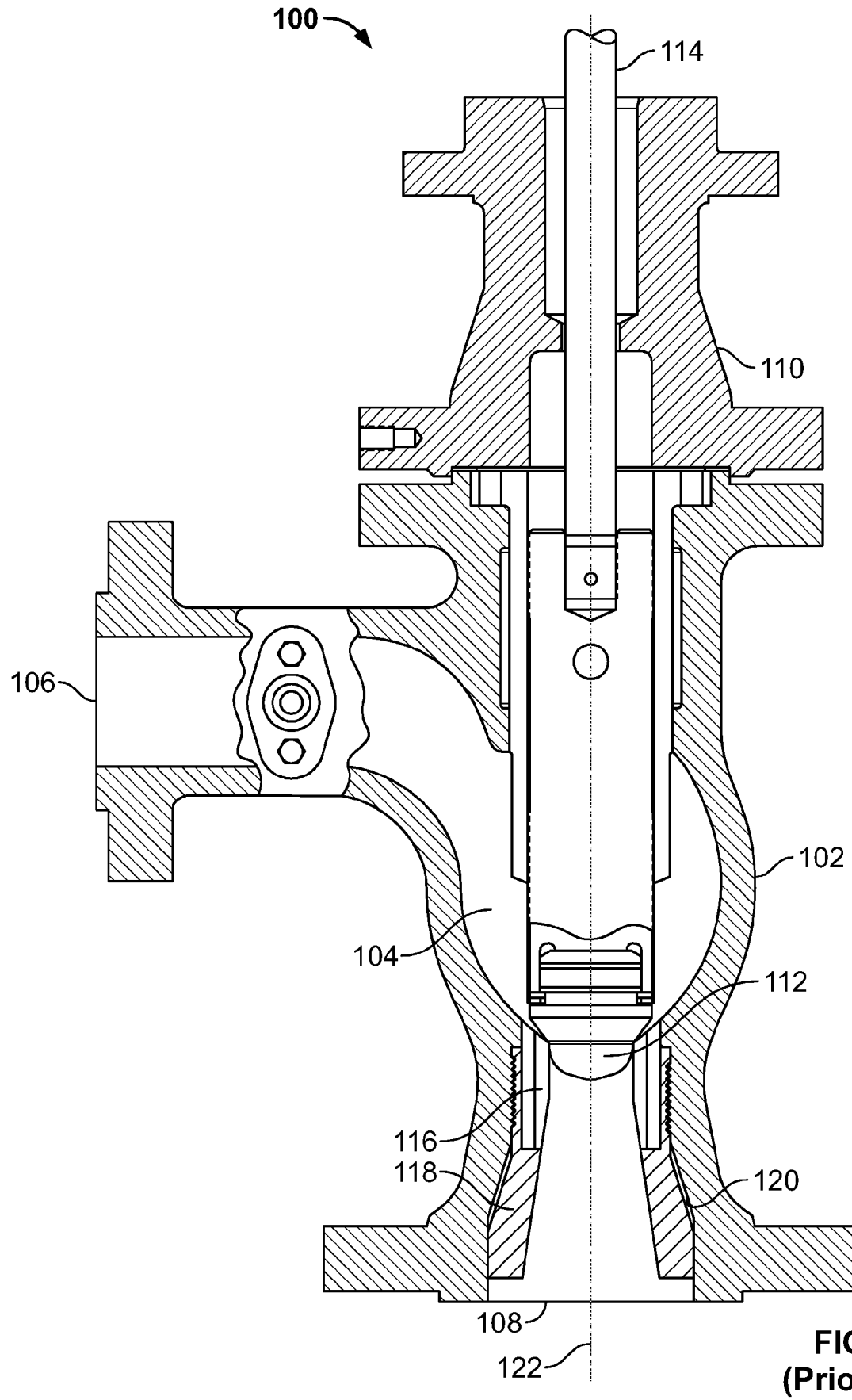
FIG. 1 illustrates a known example angle-style valve.

FIG. 1 illustrates a known angle-style valve 100. Referring in detail to FIG. 1, the example rotary valve assembly 100 includes a valve body 102 that defines a fluid flow passageway 104 between an inlet port or side port 106 and an outlet port or bottom port 108. A bonnet 110 is coupled to the valve body 102 (e.g., via fasteners) and also couples the valve body 102 to an actuator (not shown). Although not shown, the bonnet 110 may house a packing system and may include a plurality of fasteners that couple to the valve body 102. A closure member 112 is disposed within the fluid flow passageway 104 formed in the valve body 102 and is coupled to a valve stem 114. The valve stem 114 couples to an actuator stem (not shown) of the actuator, which moves the closure member 112 toward and away from a valve seat 116 (e.g., a seat ring) to control the flow of fluid between the inlet 106 and the outlet 108.

In the illustrated example, a liner 118 is integrally formed with the valve seat 116 to form a substantially unity piece or structure and couples to the valve body 102 via threads. The liner 118 is typically an elongate member and extends to protect the sides 120 of the outlet port 108 from adverse process effects such as, for example, abrasion, corrosion, etc. In other examples, the valve seat 116 and the liner 118 may be separate pieces such that the liner 118 retains the valve seat 116 within the valve body 102.

In operation, an actuator (e.g., a pneumatic actuator, an electric actuator, etc.) drives the valve stem 114 and, thus, the closure member 112 (e.g., a valve plug) between a closed position at which the closure member 112 is in sealing engagement with the valve seat 116 to restrict the flow of fluid through the valve 100 and a fully open or maximum flow rate position at which the closure member 112 is away from the valve seat 116 to allow the flow of fluid through the valve 100.

Angle-style valves such as, for example, the valve 100, advantageously channel fluid forces toward the center of the fluid flow, thereby channeling the fluid forces such as, for example, imploding bubbles formed due to cavitation, away from the valve body and/or the valve trim (e.g., seat ring, cage, valve plug, etc.). Channeling fluid forces away from the valve body and/or valve trim reduces damage to the valve body and the valve trim.

Fluid forces typically cause damage to valve components in severe service applications such as, for example, high differential pressure applications. In high differential pressure applications, fluid at the inlet 106 of the valve 100 typically has a relatively high pressure (e.g., a liquid, gas, steam, etc.) that is reduced to a substantially lower pressure at the outlet 108 of the valve 100. The pressure differential can cause cavitation, flashing, vibration, and/or other unwanted fluid forces or effects that result from the fluid pressure differential between the inlet 106 and the outlet 108 of the valve 100.

Furthermore, the pressure differential causes the velocity of the fluid flowing through the valve body 102 to increase. The increased velocity can cause the fluid flowing through the valve 100 to experience turbulent flow, which can cause vibration of the valve body 102 and/or downstream piping. The vibration causes the liner 118 to rotate about an axis 122, which can cause the liner 118 to become loose and/or dislodge from the valve body 102. This results in lost production for the time required to disassemble the valve 100 and re-couple the liner 118 to the valve body 102.

Figure 2A:
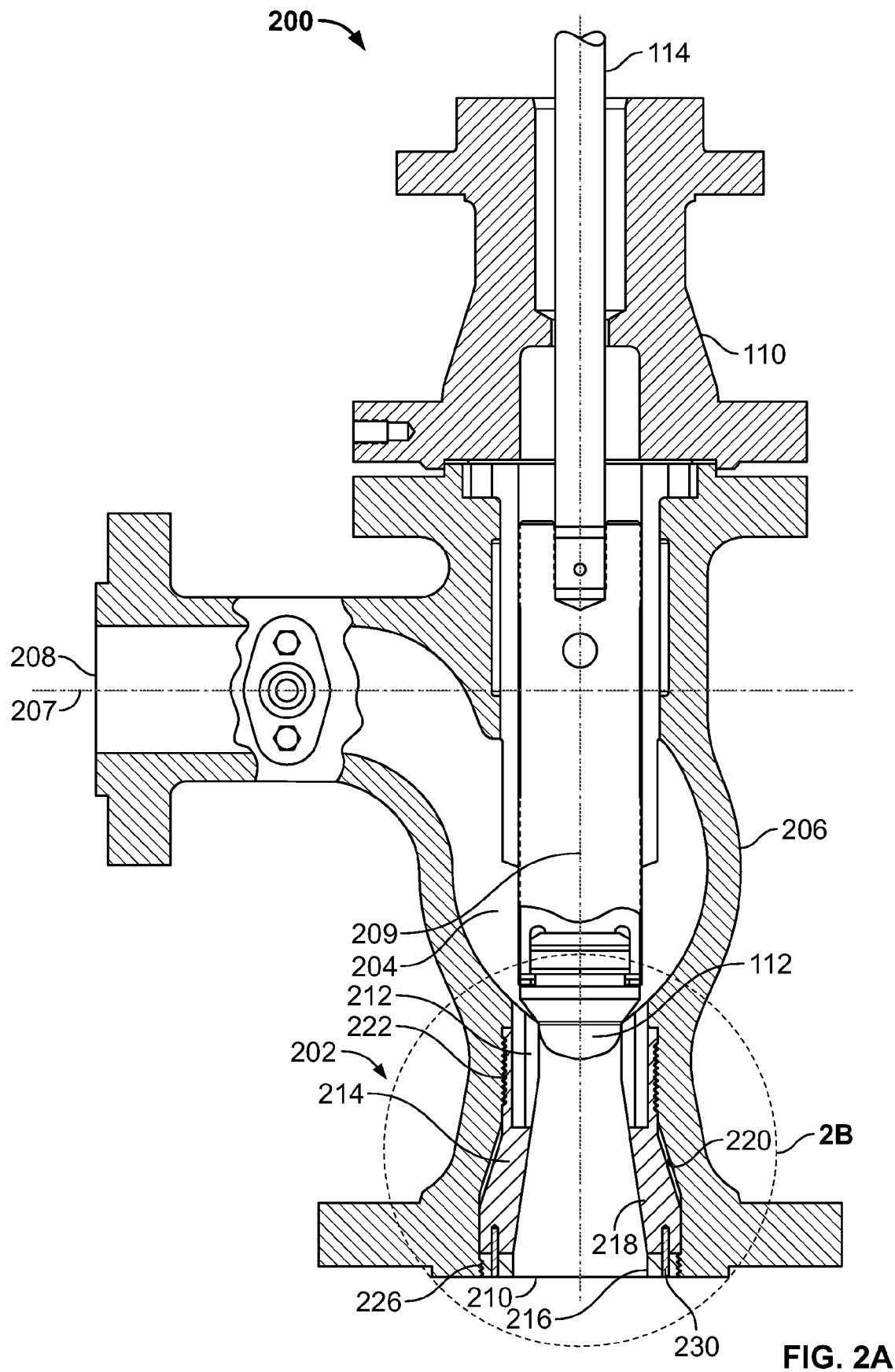
FIG. 2A illustrates an example angle-style valve implemented with the example valve trim retention apparatus described herein.
Figure 2B:
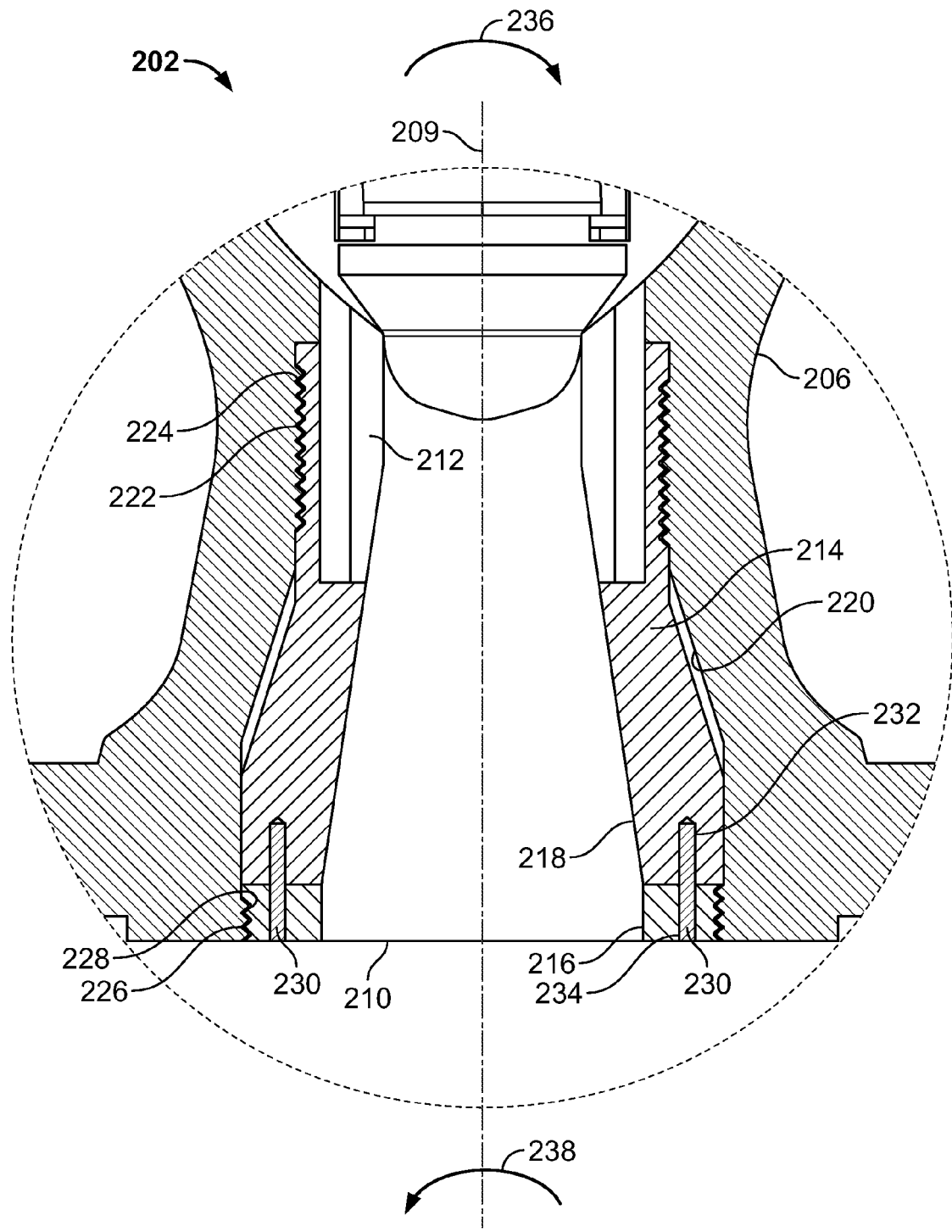
FIG. 2B illustrates an enlarged portion of the example valve trim retention apparatus illustrated in FIG. 2A.

FIG. 2A illustrates an example valve 200 implemented with an example valve trim retention apparatus 202 described herein. FIG. 2B illustrates an enlarged portion of the example valve trim retention apparatus 202 shown in FIG. 2A. Those components of the valve 200 that are similar or identical to those used in the example valve 100 of FIG. 1 are labeled with the same reference numbers. The description of those components of the example valve 200 of FIGS. 2A and 2B similar or identical to those of FIG. 1 is not repeated and the interested reader may refer to the description of FIG. 1 for details relating to those components.

Referring to FIGS. 2A and 2B, the example valve 200 includes the example valve trim retention apparatus 202 disposed within a passageway 204 formed by a valve body 206 between an inlet port or side port 208 and an outlet port or bottom port 210. In the illustrated example, an axis 207 of the inlet port 208 is substantially perpendicular to an axis 209 of the outlet port 210. The bonnet 110 is coupled to the valve body 206 (e.g., via fasteners) and also couples the valve body 206 to an actuator (not shown). The closure member 112 is disposed within the fluid flow passageway 204 and is coupled to the valve stem 114, which, in turn, is coupled to an actuator (not shown).

The valve trim retention apparatus 202 includes a seat ring 212, a seat ring retainer or liner 214, and a ring retainer 216. The seat ring 212 is disposed within the valve body 206 between the inlet 208 and the outlet 210. The liner 214 couples to the valve body 206 to retain the seat ring 212 within the valve body 206. In the illustrated example, the seat ring 212 and the liner 214 are integrally formed as a substantially unitary member or structure made of stainless steel. However, in other examples, the seat ring 212 and the liner 214 may be separate parts and may be made of any other suitable material(s).

The liner 214 includes an elongate body 218 that extends to protect a surface 220 of the outlet port 210 from adverse process effects such as, for example, abrasion, corrosion, etc. The liner 214 also includes an externally threaded outer surface 222 that engages a first internally threaded opening 224 of the valve body 206. The threads of the outer surface 222 are complementary to the threads of the first opening 224.

The ring retainer 216 engages the liner 214 to prevent the liner 214 from dislodging from the valve body 206. The ring retainer 216 includes an externally threaded outer surface 226 that engages a second internally threaded opening 228 of the valve body 206. The threads of the outer surface 226 are complementary to the threads of the second opening 228. Furthermore, the threads of the outer surface 222 and the first opening 224 of the valve body 206 are formed in a direction that is opposite from the direction of the threads of the outer surface 226 and the second opening 228. For example, the threads of the outer surface 222 and the first opening 224 are right-handed threads and the threads of the outer surface 226 and the second opening 228 are left-handed threads. In this manner, the liner 214 threads to the valve body 206 in a first direction (e.g., clockwise) and the ring retainer 216 threads to the valve body 206 in a second direction (e.g., counterclockwise) that is opposite or different from the first direction.

Additionally, the liner 214 may be coupled or fixed to the ring retainer 216 so that rotation of the liner 214 about the axis 209 causes the ring retainer 216 to also rotate about the axis 209 in the same direction as the liner 214. In the illustrated example, a plurality of pin members 230 engage apertures 232 and 234 of the liner 214 and the ring retainer 216, respectively, to couple or fix the ring retainer 216 to the liner 214. In other examples, the liner 214 may be coupled or fixed to the ring retainer 216 via a fastener, a clip, and/or any other suitable manner(s).

In operation, an actuator (e.g., a pneumatic actuator, an electric actuator, etc.) drives the valve stem 114 and, thus, the closure member 112 between a closed position at which the closure member 112 is in sealing engagement with the seat ring 212 to restrict the flow of fluid through the valve 200 and a fully open or maximum flow rate position at which the closure member 112 is away from the seat ring 212 to allow the flow of fluid through the valve 200. As stated above, in high differential pressure applications, the fluid pressure at the inlet 208 is relatively higher than the pressure at the outlet 210. This pressure differential causes the fluid to increase velocity through the valve body 206 and experience turbulent flow which, in turn, causes vibration of the valve 200. Such vibration can cause the liner 214 to rotate about the axis 209, thereby loosening and/or dislodging the liner 214 from the valve body 206.

The vibration resistant trim apparatus 202 prevents the liner 214 from loosening and/or dislodging from the valve body 206 due to vibration caused by, for example, turbulent fluid flow. For example, if vibration induced by the process fluid causes the liner 214 to rotate about the axis 209 in a direction (e.g., counterclockwise) illustrated by arrow 238, such rotation causes the liner 214 to move in a direction that tends to loosen it from the valve body 206. However, rotation of the ring retainer 216 in the same direction illustrated by arrow 238 causes the ring retainer 216 to tighten because the threads (e.g., left-handed threads) of the ring retainer 216 and second opening 228 are opposite or different from the threads (e.g., right-handed threads) of the liner 214 and the first opening 224. As a result, the ring retainer 216 prevents the liner 214 from loosening and/or dislodging from the valve body 206. Likewise, if rotation of the ring retainer 216 about the axis 209 in a direction (e.g., clockwise) illustrated by arrow 236 causes the ring retainer 216 to move in a direction that tends to loosen it from the valve body 206, rotation of the liner 214 in the same direction as illustrated by the arrow 236 causes the liner 214 to become more tightly coupled to the valve body 206.

The example valve trim retention apparatus described herein are particularly advantageous for use with angle-style valves. The example valve trim retention apparatus prevents a liner from loosening and/or dislodging from (i.e., backing out of) a valve body due to vibration (e.g., vibration induced by fluid flowing through the valve). In particular, a ring retainer couples to a liner via pins so that rotation of the ring retainer about an axis in a first direction also causes the liner to rotate in the same direction. Each of the ring retainer and the liner includes an outer surface having external threads such that the liner threadably couples (e.g., clockwise) to a valve body in a direction that is opposite to the direction in which the ring retainer threadably couples (e.g., counterclockwise) to the valve body. In this manner, if rotation of the liner in a first direction causes the liner to move in a direction that tends to loosen it, rotation of the ring retainer in the same direction causes the ring retainer to move in a direction that tends to tighten it, thereby preventing the liner from becoming loose and/or dislodging from the valve body.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. A valve trim retention apparatus, comprising:
   a liner to retain a valve seat within a valve body, the liner having an outer surface that includes first external threads to engage a first threaded opening of the valve body; and
   a ring retainer to engage the liner and having second external threads to engage a second threaded opening of the valve body, the first and second threaded openings to cause the liner and the ring retainer to move in opposite directions when the liner and the ring retainer are rotated in same direction.

2. An apparatus as defined in claim 1, further comprising at least one pin to couple the liner and the ring retainer.

3. An apparatus as defined in claim 1, wherein the first external threads are right-hand threads and the second external threads are left-hand threads.

4. An apparatus as defined in claim 1, wherein the valve seat and the liner are integrally formed.

5. An apparatus as defined in claim 1, wherein the valve seat and the liner are made of stainless steel.

6. An apparatus as defined in claim 1, wherein the valve seat comprises a seat ring.

7. An apparatus as defined in claim 1, wherein the liner comprises an elongate body.

8. A fluid valve, comprising:
   a valve body having an inlet and an outlet;
   a seat ring disposed within a passageway of the valve body between the inlet and the outlet;
   a seat ring retainer to engage the seat ring and retain the seat ring in the valve body, the seat ring retainer includes an outer surface having first external threads to engage a first internally threaded opening in the valve body, the seat ring retainer to threadably engage the first opening in a first direction; and
   a ring member to engage the seat ring retainer and having second external threads to engage a second internally threaded opening in the valve body, the ring member to threadably engage the second opening in a second direction opposite to the first direction.

9. A valve as defined in claim 8, further comprising a pin to couple the seat ring retainer and the ring member.

10. A valve as defined in claim 9, wherein the pin engages apertures formed in the seat ring retainer and the ring member.

11. A valve as defined in claim 8, wherein the first internally threaded opening and the first external threads comprise right-handed threads and the second internally threaded opening and the second external threads comprise left-handed threads.

12. A valve as defined in claim 8, wherein the seat ring and the seat ring retainer are integrally formed.

13. A valve as defined in claim 8, wherein the seat ring retainer further comprises an elongated body to line an internal surface of the valve body.

14. A valve as defined in claim 8, wherein the inlet is at an angle relative to the outlet.

15. A valve trim retention apparatus, comprising:
   means for lining a passageway of a valve body, the means for lining to retain a valve seat within a valve body; and
   means for retaining the means for lining in the passageway of the valve body, the means for retaining to prevent the means for lining from loosening in the valve body, wherein rotation of the means for lining and the means for retaining in the same direction causes the means for lining and the means for retaining to move in opposite directions to prevent the means for lining from loosening in the valve body.

16. An apparatus as defined in claim 15, wherein the means for lining includes first means for coupling the means for lining to a first portion of a valve body.

17. An apparatus as defined in claim 16, wherein the means for retaining includes second means for coupling the means for retaining to a second portion of a valve body, the first means for coupling being different than the second means for coupling.

18. An apparatus as defined in claim 15, further comprising means for attaching the means for lining and the means for retaining such that rotation of the means for lining causes the means for retaining to rotate.

\* \* \* \* \*